United States Patent [19]

Fujisawa et al.

[11] 4,259,723
[45] Mar. 31, 1981

[54] METHOD FOR CONTROLLING OPERATIONS OF A COMBUSTION ENGINE

[75] Inventors: Hideya Fujisawa; Norio Omori; Hisamitsu Yamazoe, all of Kariya; Matuju Yoshida, Bisai, all of Japan

[73] Assignee: Nippondenso Co., Ltd., Japan

[21] Appl. No.: 15,443

[22] Filed: Feb. 26, 1979

[30] Foreign Application Priority Data

May 4, 1978 [JP] Japan ................................ 53-53595

[51] Int. Cl.³ ........................... F02P 5/06; F02M 3/04
[52] U.S. Cl. .................................... 364/431; 123/416; 123/493; 364/426
[58] Field of Search ...................... 364/426, 431, 424; 123/117 D, 117 R, 148 E, 32 EH, 32 EL

[56] References Cited

U.S. PATENT DOCUMENTS

| | | | |
|---|---|---|---|
| 3,906,207 | 9/1975 | Rivere et al. | 64/431 |
| 3,969,614 | 7/1976 | Moyer et al. | 123/148 E |
| 4,002,155 | 1/1977 | Harned et al. | 123/148 E |
| 4,094,274 | 6/1978 | Harada et al. | 123/32 EL |
| 4,120,272 | 10/1978 | Douaud et al. | 123/117 D |
| 4,133,475 | 1/1979 | Harned et al. | 123/117 D |
| 4,148,283 | 4/1979 | Harada et al. | 123/32 EL X |
| 4,153,020 | 5/1979 | King et al. | 123/117 R |
| 4,162,667 | 8/1979 | Kawai et al. | 123/117 R |

FOREIGN PATENT DOCUMENTS 2801641  8/1978  Fed. Rep. of Germany ...... 123/117 R

OTHER PUBLICATIONS

Robbi et al., Gieroprocessor Ignition Advance System, New Electronics (GB), vol. 10, No. 8, Apr. 19, 1977, pp. 75, 76, 78.

Primary Examiner—Felix D. Gruber
Attorney, Agent, or Firm—Cushman, Darby & Cushman

[57] ABSTRACT

A method for controlling the supply of fuel and ignition spark for an internal combustion engine. The supply of fuel which is mixed with air is cut off upon engine deceleration and resumed thereafter. At the transition from the cut-off to resumption of supply of fuel, the timing of ignition spark which ignites the mixture of air and fuel is retarded enough to prevent an abrupt increase in an engine output torque. The retarded timing of ignition spark is then advanced gradually as the time passes so that the engine output torque increases gradually.

4 Claims, 5 Drawing Figures

METHOD FOR CONTROLLING OPERATIONS OF A COMBUSTION ENGINE

BACKGROUND OF THE INVENTION

The present invention relates a method for controlling the supply of fuel and ignition sparks to a combustion engine and, in particular, to a method for cutting off the supply of fuel upon deceleration of the combustion engine and retarding and then gradually advancing the timing of ignition spark after resuming the supply of fuel.

It is a well known practice in an engine system for automotive vehicles such as disclosed in the U.S. Pat. No. 3,969,614 that, while an internal combustion engine in which air-fuel mixture is ignited by an ignition spark is under deceleration, the supply of fuel to the engine is cut off to decrease an engine output torque. This is also effective to enhance fuel economy. The supply of fuel is, of course, resumed to increase the engine output torque, when the engine is accelerated from the decelerating condition. It is experienced very often that this abrupt increase in the engine output torque deteriorates a vehicle driveability. A more gradual increase in the engine output torque is desired at a transition from cutting off to resuming the supply of fuel to the engine.

SUMMARY OF THE INVENTION

It is therefore a primary object of this invention to increase an engine output torque gradually at a transition from cutting off to resuming the supply of fuel to an internal combustion engine for an automotive vehicle.

It is a further object of this invention to retard and then gradually advance the timing of ignition sparks supplied to the engine at the transition from cutting off to resuming the supply of fuel.

It is a still further object of this invention to advance the retarded timing of ignition sparks by a predetermined angular interval at every predetermined angular rotation of an engine output shaft.

DETAILED DESCRIPTION OF THE PREFERRED EMBODIMENTS

Figure 1:
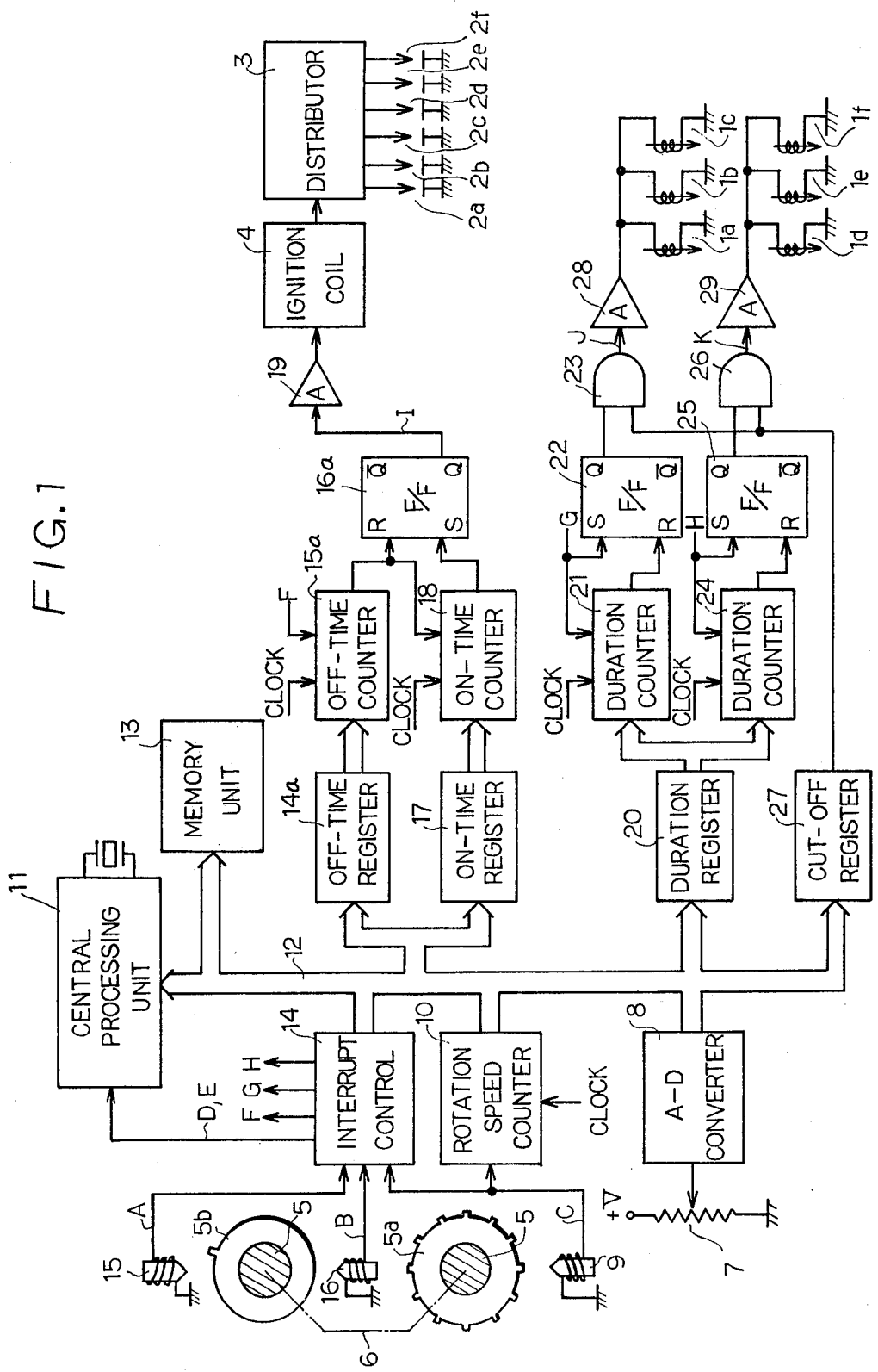
FIG. 1 is a block diagram partly in schematic showing an embodiment of this invention.

Referring first to FIG. 1, numerals $1a$ to $1f$ designate electromagnetically-operated fuel injectors mounted on the respective first, fifth, third, sixth, second and fourth intake manifolds of a six-cylinder four-stroke type internal combustion engine for supplying fuel which is mixed with air sucked therein. The fuel injectors $1a$, $1b$ and $1c$ are grouped to be energized simultaneously, while the fuel injectors $1d$, $1e$ and $1f$ are grouped to be energized simultaneously. Numerals $2a$ to $2f$ designate spark plugs mounted on the respective first, fifth, third, sixth, second and fourth cylinders of the engine for igniting air-fuel mixture sucked therein. The spark plugs $2a$ to $2f$ are operatively associated with a spark distributor 3 which sequentially applies ignition spark voltages generated from an ignition coil 4 so that the combustions of mixture occur in the first, fifth, third, sixth, second and fourth cylinders of the engine sequentially. The distributor 3 is associated with a camshaft 5 rotated by a crankshaft 6 in a known manner. The camshaft 5 which is rotated once in every two rotations of the crankshaft 6 rotates 720 degrees crank angular interval each time six combustions occur in the engine, or a suction, compression, power and exhaust strokes are completed in each cylinder of the engine.

The amount of fuel supplied from the fuel injectors $1a$ to $1f$ and the timing of ignition spark supplied from the spark plugs $2a$ to $2f$ are controlled electronically in response to the amount of air $Q_a$ sucked into the engine and the rotation speed $N_e$ of the crankshaft 6. The amount of sucked air $Q_a$ is measured by a conventional air flow meter which is disposed at the upstream of a throttle valve to provide a corresponding analog voltage. This analog voltage is applied to a conventional analog-digital converter 8 to be converted into a digital signal indicative of the amount of sucked air $Q_a$. The rotation speed $N_e$ of the crankshaft 6 is measured by a conventional electromagnetic pick-up 9 and a rotation speed counter 10. The pick-up 9 is positioned to face a disk $5a$ having twelve equi-spaced projections. The disk $5a$ is fixedly coupled with the camshaft 5 so that one of the projections faces the pick-up 9 at the arrival of an engine piston to the top dead center and the pick-up 9 generates a train of pulses C during the rotation of the crankshaft 6. As shown in (C) of FIG. 2, each of the pulses C are generated at every 60 degrees rotation of the crankshaft 6. The interval of time of each of the pulses C changing in accordance with a change in the rotation speed $N_e$ of the crankshaft 6 is measured in a known manner by the rotation speed counter 10 which uses clock pulses having a fixed frequency for speed measurement. The counter 10 provides a digital signal indicative of the rotation speed $N_e$ of the crankshaft 6.

The converter 8 and the counter 10 are connected to a central processing unit 11 via a bilateral bus 12 so that the digital signals are used for the calculations of the required fuel amount and spark timing. The central processing unit 11 may be a commercially available integrated circuit such as T3190 manufactured by TOKYO SHIBAURA ELECTRIC CO., LTD. of Japan. The sequence of calculations performed by the unit 11 is preliminarily programmed in a memory unit 13 connected to the unit 11 via the bus 12. The memory unit 13 includes commercially available integrated circuits TMM111C, TMM121C and T3410 manufactured by TOKYO SHIBAURA ELECTRIC CO., LTD. of Japan. The central processing unit 11 is connected to an interrupt control unit 14 which includes a commercially available integrated circuit T3219 manufactured by TOKYO SHIBAURA ELECTRIC CO., LTD. and associated circuits. The interrupt control unit 14 initiates the calculations of the required fuel amount and spark timing in response to the rotational position of the crankshaft 6.

Figure 2:
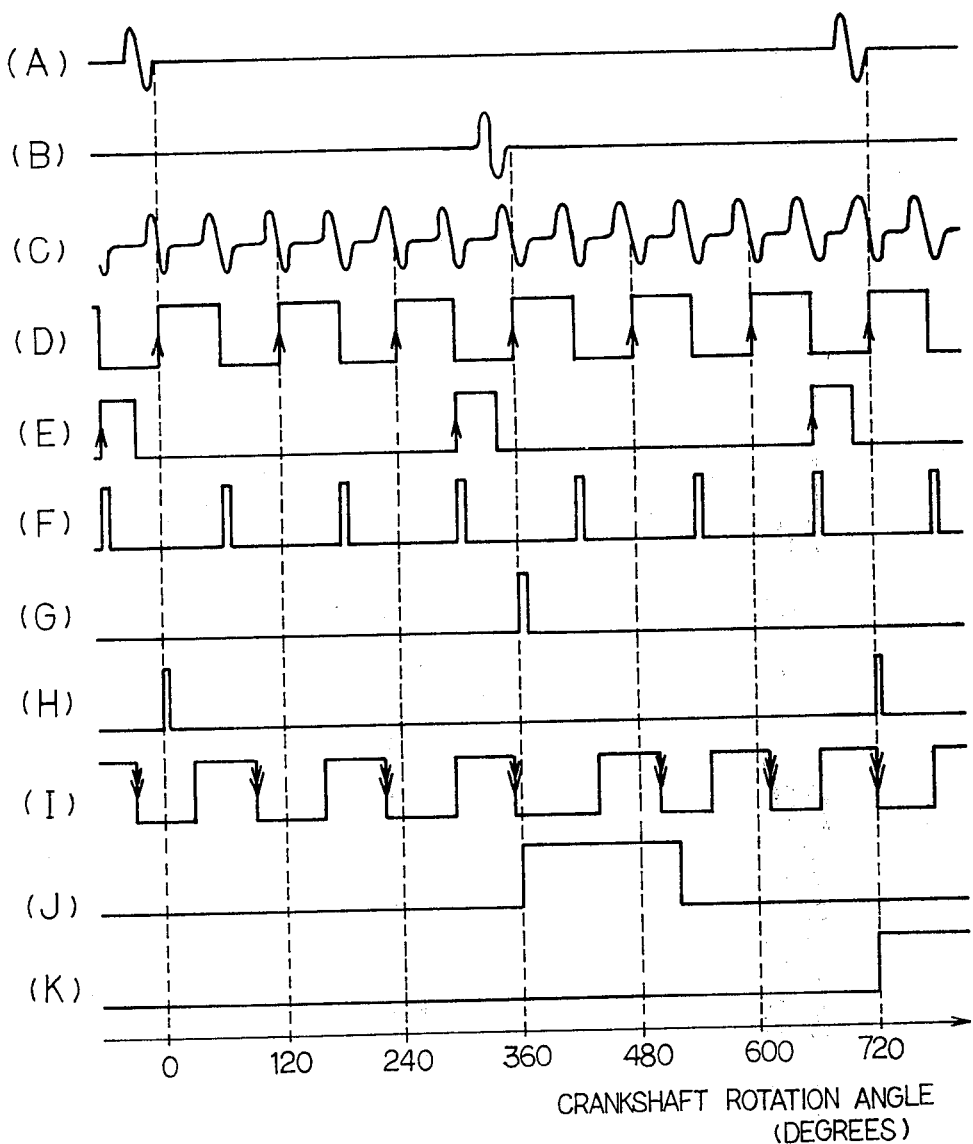
FIG. 2 is a waveform chart showing signal waveforms (A) to (K) developed in the embodiment shown in FIG. 1.

For this purpose, the interrupt control unit 14 is connected to the pick-up 9 and another two electromagnetic pick-ups 15 and 16 which are positioned to face a disk 5b at 360 degrees crankshaft rotation interval. The disk 5b is fixedly coupled to the camshaft 5 and has a single projection which passes through the pick-ups 15 and 16 slightly before the respective arrivals of the first cylinder piston and the sixth cylinder piston to the top dead center between the compression and power strokes. As shown in (A) and (B) of FIG. 2, the pick-ups 15 and 16 generate respective pulses A and B in two rotations of the crankshaft 6. Each time the pulse A is generated from the pick-up 15, the frequency rate of the following pulses C, generated from the pick-up 9 and applied interrupt control 14, is divided by two to produce resulting pulses D as shown in (D) of FIG. 2. Pulses D are applied to the central processing unit 11 via an interrupt request line to initiate the calculation of the required spark timing. On the other hand, each time the pulses A and B are generated, the pulses C generated from the pick-up 9 is divided by six in frequency. The resulting pulses E shown in (E) of FIG. 2 are also applied to the central processing unit 11 via the interrupt request line to initiate the calculation of the required fuel amount. The interrupt control unit 14 provides the central processing unit 11 via the bus 12 with digital signals indicative of the respective commands of the calculations of the fuel amount and the spark timing in relation to the pulses D and E.

The interrupt control unit 14 provides other pulses F, G and H which are used, as will be described later, to control counters 15a, 21 and 24. The pulses F are generated as shown in (F) of FIG. 2 at 120 degrees crankshaft rotation interval. Each of the pulses F is generated at 60 degrees before the arrival of each piston to the top dead center position between the compression and power strokes. The pulses G are generated as shown in (G) of FIG. 2 at 360 degrees crankshaft rotation interval. Each of the pulses G is in synchronism with the arrival of the sixth cylinder piston at the top dead center position between the compression and power strokes. The pulses H are generated as shown in (H) of FIG. 2 at 360 degrees crankshaft rotation interval. Each of the pulses H is in synchronism with the arrival of the first cylinder piston at the top dead center position between the compression to power strokes.

Figure 3:
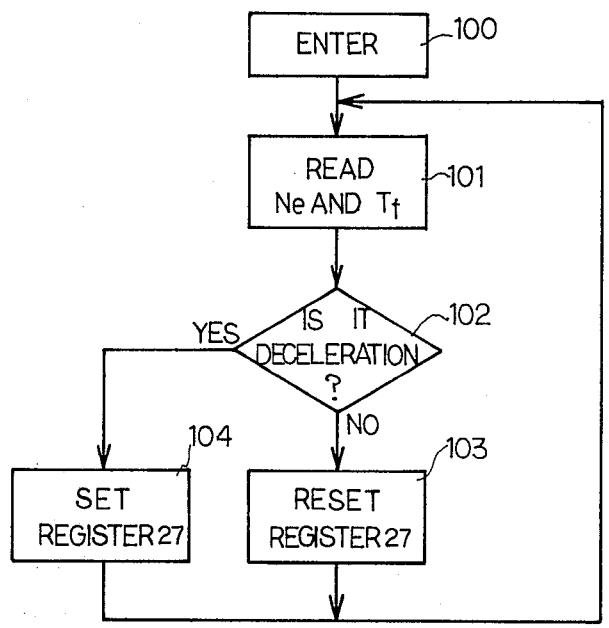
FIG. 3 is a flow chart showing a main calculation routine performed at every predetermined interval by a microprocessor shown in FIG. 1.

The sequence of calculations performed by the central processing unit 11 is described next with reference to flow charts shown in FIGS. 3 and 4. The central processing unit 11 enters into a main routine at a step 100 shown in FIG. 3 at a constant interval of time. After the step 100, digital values indicative of the rotation speed $N_e$ measured by the speed counter 10 and an opening duration $T_f$ of the fuel injectors 1a to 1f are read at a step 101. The opening duration $T_f$ proportional to the required fuel amount is calculated in an interrupt routine which will be described later. The rotation speed digital value and the opening duration digital value are compared with respective constant values at a step 102 so that it is discriminated whether the engine is under deceleration or not. The constant values are predetermined to correspond with a constant speed (1500 rpm) and a constant duration (1.6 ms), respectively. Provided that the rotation speed $N_e$ is lower than the constant speed or the opening duration $T_f$ is longer than the constant duration, the discrimination result becomes NO to indicate that the engine is not under deceleration. On this occasion, a cut-off register 27 shown in FIG. 1 is reset to provide a high level signal. Provided that the rotation speed $N_e$ is higher than the constant speed and the opening duration $T_f$ is shorter than the constant duration, the discrimination result becomes YES to indicate that the engine is under deceleration. On this occasion, the cut-off register 27 is set to provide a low level signal. The discrimination results are memorized temporarily in the memory unit 13 to be referred to later. As will be described later, the cut-off register 27 is effective to allow or prevent the supply of fuel to the engine. The above described main routine is repeated at a predetermined constant interval of time. It should be noted that, even when the main routine is interrupted by the interrupt routine shown in FIG. 4, the main routine is resumed after the completion of the interrupt routine.

Figure 4:
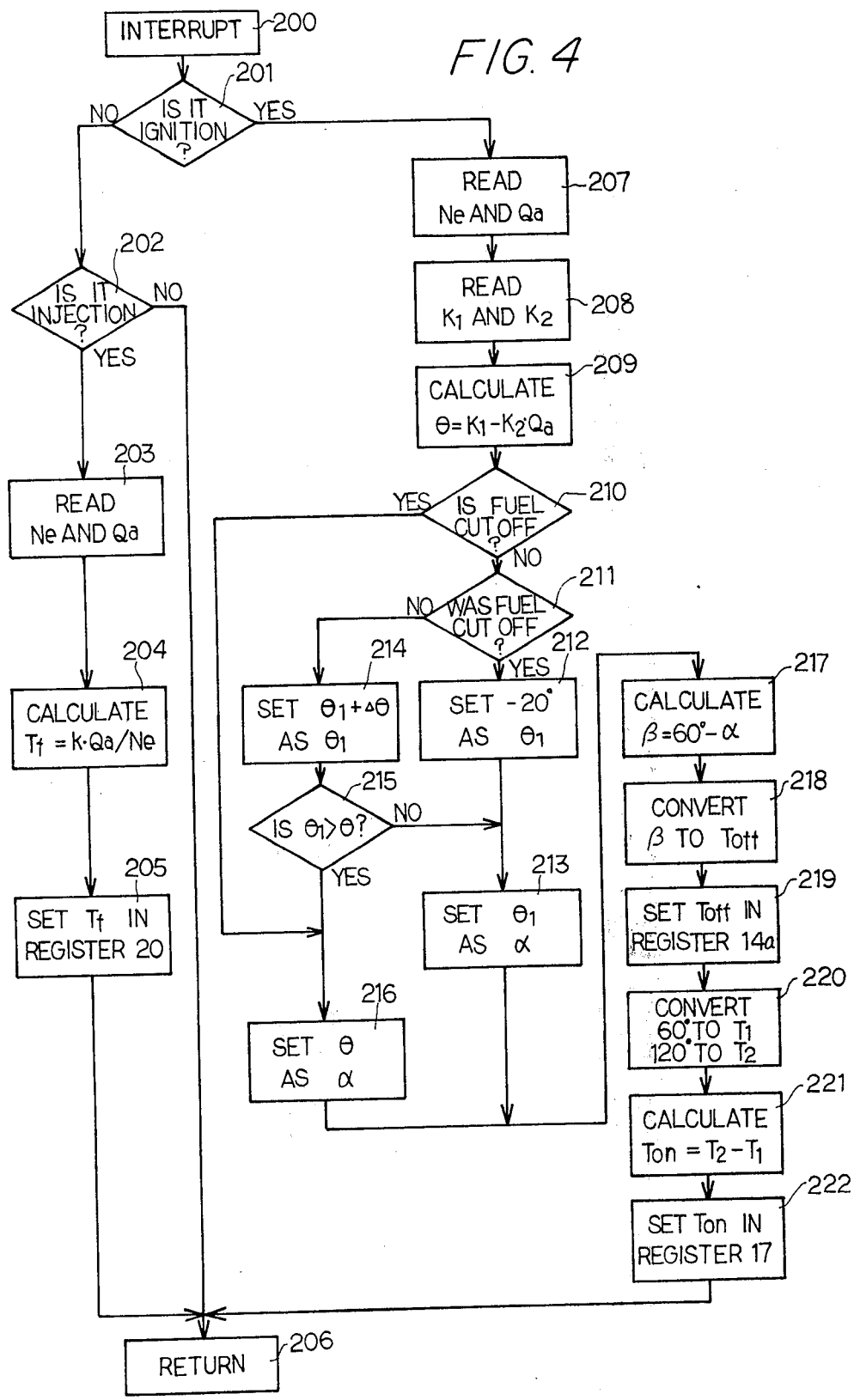
FIG. 4 is a flow chart showing an interrupt calculation routine performed by the microprocessor at every predetermined angular rotation of an engine output shaft.

The central processing unit 11 enters into the interrupt routine at a step 200 shown in FIG. 4, when the pulses D or E are applied through the interrupt request line from the interrupt control unit 14. After the step 200, it is discriminated in view of the digital signal provided from the unit 14 whether the calculation of the fuel amount or the spark timing is required. When the pulse E which initiates the calculation of the fuel amount is applied, the discrimination results of steps 201 and 202 become NO and YES, respectively, so that the step 202 is followed by a step 203. The rotation speed digital value provided from the speed counter 10 and the sucked air digital value provided from the converter 8 are read at the step 203, and the required fuel amount is calculated at a step 204 in terms of the opening duration of the fuel injectors 1a to 1f. The opening duration $T_f$ is calculated from a predetermined equation $T_f = K \cdot Q_a / N_e$ (k:constant). The calculated opening duration $T_f$ is set in a duration register 20 shown in FIG. 1 at a step 205. The calculated duration $T_f$ is temporarily memorized in the memory unit 13 to be referred to at the step 102 described with reference to FIG. 3. When the step 205 has been performed or the discrimination result of the step 202 has become NO, the calculation sequence of the central processing unit 11 returs to the interrupted main routine. It should be noted that, since the pulse E is applied at 360 degrees crankshaft rotation interval, the required fuel amount is calculated twice in two rotations of the crankshaft 6.

Figure 5:
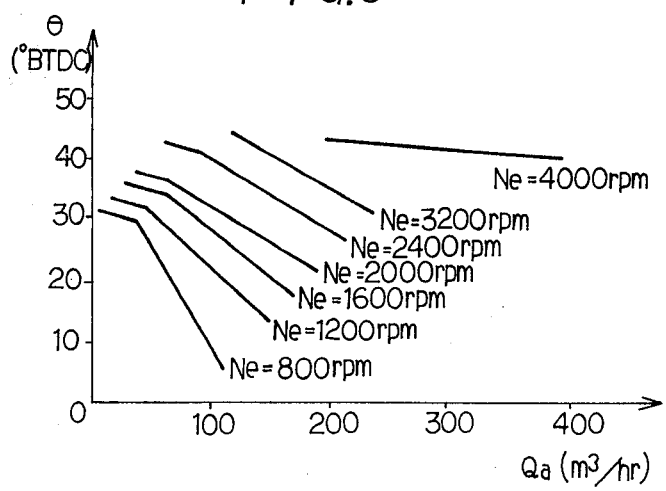
FIG. 5 is a graph showing an ignition spark timing relative to the amount of sucked air.

Contrary to the calculation of the required fuel amount, the calculation of the required spark timing is initiated, when the discrimination result of the step 201 has become YES in response to the pulse D. After the step 201, the rotation speed digital value and the sucked air digital value are read at a step 207, and two constants $k_1$ and $k_2$ are read at a step 208 so that the spark timing is calculated at a step 209 in terms of a spark advance angle $\theta$ relative to the piston top dead center. The advance angle $\theta$ is expressed as $\theta = k_1 - k_2 \cdot Q_a$. The constants $K_1$ and $k_2$ determined in relation to the rotation speed $N_e$ are preliminarily memorized in the memory unit 13 so that the spark advance angle $\theta$ may be calculated from the sucked air $Q_a$ as shown in FIG. 5. As can be understood from FIG. 5 which is obtained experimentally, the constants $K_1$ and $k_2$ represent an ordinate's intersection and a slope of each linear equation, respectively. After the step 209, it is discriminated at a step 210 in view of the discrimination result of the step 102 temporarily memorized in the memory unit 13 whether the supply of fuel to the engine is currently cut off or not. Provided that the supply of fuel is cut off because of deceleration of the engine, the calculated advance angle $\theta$ is set directly as a final advance angle $\alpha$ at a step 216. Provided that the supply of fuel is not cut off, it is further discriminated at a step 211 whether the supply of fuel was cut off in the preceding fuel supply cycle or not. Provided that the supply of fuel was cut off in the preceding fuel supply cycle, a predetermined value −20 degrees is set as a corrected advance angle $\theta_1$ at a step 212 so that the corrected advance angle $\theta_1$ is set directly as the final advance angle $\alpha$ at a step 213. Provided that the supply of fuel was not cut off, a predetermined small angle $\Delta\theta_1$ (e.g. 1 degree) is added to the corrected advance angle $\theta_1$ and the corrected advance angle $\theta_1+\Delta\theta_1$ is set newly as the corrected advance angle $\theta_1$ at a step 214. The corrected advance angle $\theta_1$ obtained at the step 214 is compared at a step 215 with the advance angle $\theta$ calculated at the step 209. When the corrected advance angle $\theta_1$ is larger than the advance angle $\theta$, the advance angle $\theta$ calculated at the step 209 is set as the final advance angle $\alpha$ at the step 216. On the contrary, when the corrected advance angle $\theta_1$ is smaller than the advance angle $\theta$, the corrected advance angle $\theta_1$ is set as the final advance angle $\alpha$ at the step 213.

After the step 213 or 216, the final advance angle $\alpha$ relative to the piston top dead center position between the compression to power strokes is converted into a spark retard angle $\beta$ relative to a position which is 60 degrees before the piston top dead center position. The retard angle $\beta$ is calculated from an equation $\beta = 60 - \alpha$ at a step 217. The retard angle $\beta$ is then converted into a time interval $T_{off}$ at a step 218 using the rotation speed $N_e$. The time interval $T_{off}$ represents the interval of time from the arrival of the crankshaft 6 at 60 degrees before the piston top dead center to the arrival of the crankshaft 6 at the retard angle $\beta$ where the ignition coil 4 is deenergized to generate the ignition spark. The calculated time interval $T_{off}$ is set in an off-time register 14a shown in FIG. 1 at a step 219. At a next step 220, 60 degrees crankshaft rotation interval and 120 degrees crankshaft rotation interval are converted into respective time intervals $T_1$ and $T_2$ using the rotation speed $N_e$. In other words, the time intervals $T_1$ and $T_2$ in which the crankshaft 6 rotates respective 60 degrees interval and 120 degrees interval are calculated. The 60 degrees rotation interval represents a required interval in which the ignition coil 4 must be energized, while the 120 degrees rotation interval represents an interval at which the ignition coil 4 substantially generates the spark voltage. The time interval $T_1$ is subtracted from the time interval $T_2$ at a step 221. A resultant time interval $T_{on}$ represents an interval of time which must elapse from the deenergization of the ignition coil 4 to the energization of the ignition coil 4. The calculated time interval $T_{on}$ is set in an on-time register 17 shown in FIG. 1 at a step 222. After the step 222, the calculation sequence of the central processing unit 11 returns to the interrupted main routine. It should be noted, that, since the pulse D is applied at 120 degrees crankshaft rotation interval, the required spark timing is calculated six times in two rotations of the crankshaft 6.

As shown in FIG. 1, the off-time register 14a and on-time register 17 both of which may be a commercially available integrated circuit T3220 manufactured by TOKYO SHIBAURA ELECTRIC CO., LTD. of Japan are connected to the central processing unit 11 through the bus 12. The off-time register 14a and on-time register 17 are connected to an off-time counter 15a and on-time register 18, respectively. Each time the pulse F which is produced at 60 degrees before the piston top dead center position is applied, the counter 15a presets therein the calculated time interval $T_{off}$ temporarily memorized in the register 14a and counts the preset value down in response to the clock pulses. When the counter 15a completes the countdown, a flip-flop 16a connected to the counter 15a is reset and changes an output signal I from high level to low level as shown in (I) of FIG. 2. The output signal I is applied to the ignition coil 4 through an amplifier 19. The ignition coil 4 is deenergized at the trailing edge of the output signal I and generates the spark voltage which is supplied to the appropriate one of spark plugs 2a to 2f to ignite the mixture subjected to the compression stroke. On the other hand, each time the counter 15 completes the count-down, the counter 18 presets therein the calculated time interval $T_{on}$ temporarily memorized in the register 17 and counts the preset value down in response to clock pulses. When the counter 18 completes the count-down, the flip-flop 16a is set and changes the output signal I from the low level to the high level as shown in (I) of FIG. 2. The ignition coil 4 is energized at the leading edge of the output signal I to store electric energy required for generating the next spark voltage.

The duration register 20 and cut-off register 27 both of which may also be a commercially available integrated circuit T3220 are connected to the central processing unit 11 through the bus 12. The duration register 20 is connected to duration counters 21 and 24 which preset therein the calculated duration $T_f$ temporarily memorized in the register 20 upon receipt of the respective pulses G and H shown in (G) and (H) of FIG. 2. The counter 21, counting the preset value down in response to the clock pulses, resets a flip-flop 22 at the completion of the count-down. The flip-flop 22, having been set by the pulse G, provides an AND gate 23 with a high level output signal having the time interval $T_f$. The counter 24, counting the preset value down in response to the clock pulses, resets a flip-flop 25 at the completion of the count-down. The flip-flop 25, having been set by the pulse H, provides an AND gate 26 with a high level output signal having the time interval $T_f$. The AND gates 23 and 26 are connected to the cut-off register 27 which provides the low level and high level output signals indicating that the engine is decelerated and is not decelerated, respectively. When the low level output signal is applied from the register 27, the AND gates 23 and 26 prevent the high level output signals of the flip-flop 22 and 25 as shown at the left half in (J) and (K) of FIG. 2. On the contrary, when the high level output signal is applied, the AND gates 23 and 26 provides the respective high level output signals J and K as shown at the right half in (J) and (K) of FIG. 2. It is a matter of course that the output signals J and K have the time intervals $T_f$. The output signal J is applied through an amplifier 28 to simultaneously energize the fuel injectors 1a, 1b and 1c, while the output signal K is applied through an amplifier 29 to simultaneously energize the fuel injectors 1d, 1e and 1f.

The operation of the embodiment utilizing the engine control method according to the present invention is briefly described next. While the crankshaft 6 is rotated normally with the throttle valve of the six-cylinder four-stroke engine being kept open, the electromagnetic pick-up 15, 16 and 9 provide the respective pulses A, B, C as shown in (A), (B) and (C) of FIG. 2 and the interrupt control unit 14 responsively provides the pulses D, E, F, G, and H as shown in (D), (E), (F), (G) and (H) of FIG. 2. The central processing unit 11, receiving the pulse E at every rotation of the crankshaft 6, performs the steps 200 to 206 to calculate the required fuel amount in terms of the opening duration $T_f$ of the fuel injectors $1a$ to $1f$. The calculated opening duration $T_f$ is converted into the time intervals of the output signals J and K by the duration counters 21 and 24 as shown in (J) and (K) of FIG. 2 in response to the respective pulses G and H shown in (G) and (H) of FIG. 2. The fuel injectors $1a$, $1b$ and $1c$ are energized in response to the output signal J so that the injected fuel is mixed with air sucked through the throttle valve in the first, fifth and third intake manifolds of the engine at every two rotations of the crankshaft 6, while the fuel injectors $1d$, $1e$ and $1f$ are energized in response to the output signal K so that the injected fuel is mixed with air in the sixth, second and fourth intake manifolds. The central processing unit 11, receiving the pulse D at different timings from the pulse E, performs the steps 200, 201, 207 to 211, 214 to 222 and 206 sequentially to calculate the spark timing in terms of coil deenergization time $T_{off}$ and energization time $T_{on}$. The calculated time intervals $T_{off}$ and $T_{on}$ are converted into the output signal I as shown in (I) of FIG. 2 by the off-time and on-time counters 15 and 18. The ignition coil 4 generates six spark voltages in response to the output signals I in two rotations of the crankshaft 6 so that the spark plugs $2a$ to $2f$ sequentially supplied with the spark voltages through the spark distributor 3 ignite the mixture in the cylinders. As a result, the combustion of mixture occurs in the first, fifth, third, sixth, second and fourth cylinders of the engine sequentially to rotate the crankshaft 6 which produces the output torque required for the running of the automotive vehicle.

When the throttle valve is closed to decelerate the engine, the amount of sucked air $Q_a$ measured by the air-flow meter 7 and the converter 8 decreases. The opening duration $T_f$ calculated by the central processing unit 11 responsively becomes short enough. As long as the opening duration is short enough and the rotation speed $N_e$ measured by the speed counter 10 is high enough, the central processing unit 11 sets the cut-off register 27 during performing the steps 100, 101, 102 and 104. The cut-off register 27 then provides the AND gates 23 and 26 with the low level output signal which prevents the output signals of the flip-flops 22 and 25 from being applied to the amplifiers 28 and 29. As a result, the fuel injectors $1a$ to $1f$ are not energized even when the duration counters 21 and 24 produce the respective output signals having the time intervals equal to the opening duration $T_f$ calculated by the central processing unit 11. Cutting off the supply of fuel upon engine deceleration is effective to enhance the fuel economy and the engine braking. It should be understood at the left half in (K) of FIG. 2 that the output signal K which is to be produced in synchronism with the pulse H is not produced because of engine deceleration.

When the rotation speed $N_e$ becomes low enough or the opening interval $T_f$ calculated in the central processing unit 11 becomes long enough, the supply of fuel is resumed to prevent the engine from stalling. On this occasion, the central processing unit 11 resets the cut-off register 27 by performing the steps 100, 101, 102 and 103. The cut-off register 27 responsively provides the AND gates 23 and 26 with the high level output signal so that the output signals of the flip-flops 22 and 25 passes through the AND gates 23 and 26 to become the output signals J and K shown at the right half in (J) and (K) of FIG. 2. As a result, the supply of fuel is resumed by the fuel injectors $1a$ to $1f$. When the supply is thus resumed for the first time, the central processing unit 11 which calculates the spark timing in response to the pulse D performs the steps 200, 201, 207 to 213, 217 to 222 and 206 sequentially so that the spark advance angle is retarded to the constant angle $-20$ degrees. As a result, the mixture in the engine cylinder is not ignited during the compression stroke but ignited during the power stroke. This is effective to prevent the abrupt increase in the output torque of the crankshaft 6. Each time the pulses D are applied thereafter, the central processing unit 11 performs the steps 200, 201, 207 to 211, 214, 215, 213, 217 to 222, and 206 to gradually advance the retarded spark advance angle. The gradual advance in the spark timing from the power stroke to the compression stroke of the engine is effective to gradually increase the output torque of the crankshaft 6. This gradual advance in the spark timing is maintained until the gradually advanced spark timing reaches the spark timing repeatedly calculated from the sucked air $Q_a$ in the central processing unit 11. Changes in the spark timings in relation to the resumption of fuel supply will be clearly understood from the output signal I which is shown at the right half in (I) of FIG. 2.

The present invention is not limited to the embodiment described hereinabove but may be modified in many ways with ease without departing from the spirit of the invention.

What we claim is:

1. A method for automatically controlling operations of a combustion engine with electronic circuitry, said engine having an output shaft rotated by the combustion of fuel mixed with air and ignited by an ignition spark, the amount of said fuel and the timing of said ignition spark being calculated repeatedly according to operating conditions of said combustion engine while said output shaft is in rotation, said method comprising the steps of:

discriminating whether a decelerating condition of said combustion engine is present or absent;
   cutting off the supply of said calculated fuel in response to a first discrimination result indicative of a presence of said decelerating condition;
   resuming the supply of said calculated fuel in response to a second discrimination result indicative of an absence of said decelerating condition;
   retarding, after a transition from said first to second discrimination results, the timing of said ignition spark supplied to said combustion engine to be later than that of said calculated ignition spark; and
   advancing gradually, after said timing retarding step, the timing of said ignition spark supplied to said combustion engine from the timing of said retarded ignition spark toward that of said calculated ignition spark.

2. A method for automatically controlling operations of a combustion engine with electronic circuitry, said engine having an output shaft rotated by the combustion of fuel mixed with air and ignited by an ignition spark, the amount of said fuel and the angular position of said ignition spark being calculated repeatedly according to operating conditions of said combustion engine while said output shaft is in rotation, said method comprising the steps of:

discriminating whether a decelerating condition of said combustion engine is present or absent;
   cutting off the supply of said calculated fuel in response to a first discrimination result indicative of a presence of said decelerating condition;

resuming the supply of said calculated fuel in response to a second discrimination result indicative of an absence of said decelerating condition;

retarding, after a transition from said first to second discrimination results, the angular position of said ignition spark supplied to said combustion engine to a predetermined angular position at which said output shaft arrives after the arrival at the angular position of said calculated ignition spark; and advancing, after said position retarding step, the angular position of said ignition spark supplied to said combustion engine by a predetermined angular interval from the angular position of said retarded ignition spark toward that of said calculated ignition spark.

3. A method for automatically controlling operations of a combustion engine with electronic circuitry, said engine having an output shaft rotated by the combustion of injected fuel mixed with air and ignited by an ignition spark, the duration of injecting fuel and the angular position of said ignition spark being calculated repeatedly according to at least the amount of said air sucked into said combustion engine and the rotation speed of said output shaft while said output shaft is in rotation, said method comprising the steps of:

discriminating whether a decelerating condition of said combustion engine is present or absent in relation to the duration of said calculated fuel and said rotation speed of said output shaft;

cuttting off the supply of said calculated fuel in response to a first discrimination result indicative of an absence of said decelerating condition;

resuming the supply of said calculated fuel in response to a second discrimination result indicative of an absence of said decelerating condition;

retarding, after a transition from said first to second discrimination results, the angular position of said ignition spark supplied to said combustion engine to a predetermined angular position at which said output shaft arrives after the arrival at the angular position of said calculated ignition spark; and advancing, after said position retarding step, the angular position of said ignition spark supplied to said combustion engine by a predetermined angular interval from the angular position of said retarded ignition spark toward that of said calculated ignition spark.

4. A method for automatically controlling operations of a combustion engine with electronic circuitry, said engine having an output shaft rotated by at least one piston in an associated cylinder driven by the combustion of fuel mixed with air and ignited by an ignition spark in said cylinder, the amount of said fuel and the timing of said ignition spark being calculated repeatedly according to operating conditions of said combustion engine while said output shaft is in rotation, said method comprising the steps of:

discriminating whether a decelerating condition of said combustion engine is present or absent;

cutting off the supply of said calculated fuel in response to a first discrimination result indicative of a presence of said decelerating condition;

retarding, after a transition from said first to second discrimination results, the timing of said ignition spark supplied to said combustion engine to be after arrival of said at least one piston to top dead center position in said associated cylinder; and advancing gradually, after said timing retarding step, the timing of said ignition spark supplied to said combustion engine from the timing of said retarded ignition spark toward that of said calculated ignition spark.

* * * * *